(12) United States Patent
Kurakake et al.

(10) Patent No.: US 8,914,966 B2
(45) Date of Patent: Dec. 23, 2014

(54) DIE FOR MOLDING HONEYCOMB STRUCTURE, AND ITS PRODUCTION METHOD

(75) Inventors: Kazuyuki Kurakake, Moka (JP); Tomohisa Ogata, Moka (JP)

(73) Assignee: Hitachi Metals, Ltd., Tokyo (JP)

( * ) Notice: Subject to any disclaimer, the term of this patent is extended or adjusted under 35 U.S.C. 154(b) by 84 days.

(21) Appl. No.: 12/440,132

(22) PCT Filed: Oct. 29, 2007

(86) PCT No.: PCT/JP2007/071060
§ 371 (c)(1),
(2), (4) Date: Apr. 21, 2009

(87) PCT Pub. No.: WO2008/053854
PCT Pub. Date: May 8, 2008

(65) Prior Publication Data
US 2010/0003362 A1    Jan. 7, 2010

(30) Foreign Application Priority Data
Oct. 27, 2006  (JP) ................................. 2006-293171

(51) Int. Cl.
B29C 47/12    (2006.01)
B23P 15/24    (2006.01)
B28B 3/20     (2006.01)

(52) U.S. Cl.
CPC ......... B23P 15/243 (2013.01); *B28B 2003/203* (2013.01)
USPC .......... 29/558; 83/875; 264/177.12; 425/380; 425/467

(58) Field of Classification Search
USPC ........ 425/380, 461, 467; 264/177.12; 29/557, 29/558; 83/863, 875
See application file for complete search history.

(56) References Cited

U.S. PATENT DOCUMENTS

| 3,836,302 | A | * | 9/1974 | Kaukeinen ................... 425/197 |
| 3,905,743 | A | * | 9/1975 | Bagley ......................... 425/464 |
| 4,168,944 | A |   | 9/1979 | Morikawa et al. |
| 4,381,912 | A | * | 5/1983 | Yamamoto et al. .......... 425/461 |
| 6,357,330 | B1 | * | 3/2002 | Dass et al. ....................... 83/863 |
| 6,448,530 | B1 |   | 9/2002 | Fujita et al. |
| 6,732,621 | B2 | * | 5/2004 | Iwata et al. ....................... 83/51 |
| 2002/0153356 | A1 | * | 10/2002 | Fujita et al. ................ 219/69.17 |

FOREIGN PATENT DOCUMENTS

| CA | 2018989 | * | 12/1990 |
| EP | 0 402 593 A1 | | 12/1990 |
| JP | 53-026857 A | | 3/1978 |
| JP | 06-206271 A | | 7/1994 |

(Continued)

OTHER PUBLICATIONS

Supplementary European Search Report dated Oct. 14, 2009 in corresponding European Patent Application No. 07 830 794.9.

(Continued)

*Primary Examiner* — Yogendra Gupta
*Assistant Examiner* — Joseph Leyson
(74) *Attorney, Agent, or Firm* — Sughrue Mion, PLLC

(57) ABSTRACT

A die having large numbers of grooves for molding a material to a honeycomb structure, wherein a surface having the grooves has an outer periphery in a polygonal shape having 6 or more corners, and wherein the grooves are crossing the outer periphery at an angle of 30° or more.

2 Claims, 6 Drawing Sheets

(56) References Cited

FOREIGN PATENT DOCUMENTS

| | | |
|---|---|---|
| JP | 09-141629 A | 6/1997 |
| JP | 11-070510 A | 3/1999 |
| JP | 11-320526 A | 11/1999 |
| JP | 2001-113513 A | 4/2001 |
| JP | 2002-239844 A | 8/2002 |
| JP | 2006-159571 A | 6/2006 |

OTHER PUBLICATIONS

Chinese Office Action dated Feb. 28, 2011.
Notification of Reasons for Refusal, dated Nov. 20, 2012, issued in the Japanese Patent Office in corresponding Japanese Patent Application No. 2008-542109, along with an English translation thereof.

\* cited by examiner

DIE FOR MOLDING HONEYCOMB STRUCTURE, AND ITS PRODUCTION METHOD

CROSS REFERENCE TO RELATED APPLICATIONS

This application is a National Stage of International Application No. PCT/JP2007/071060, filed Oct. 29, 2007, claiming priority based on Japanese Patent Application No. 2006-293171, filed Oct. 27, 2006, the contents of all of which are incorporated herein by reference in their entirety.

FIELD OF THE INVENTION

The present invention relates to a die used for the extrusion molding of a honeycomb structure, and its production method.

BACKGROUND OF THE INVENTION

A ceramic honeycomb structure (simply called "honeycomb structure" below) used as a filter for cleaning an exhaust gas, etc. is produced by extruding a moldable ceramic material through a honeycomb-structure-molding die (simply called "molding die" or "die") to form a honeycomb molding, and drying and sintering it. As shown in FIGS. 2(a) and 2(b), a honeycomb structure 10 comprises porous cell walls 2 defining large numbers of flow paths 3 and an outer peripheral wall 1, and usually has a substantially circular or elliptic cross section perpendicular to the flow paths.

As shown in FIGS. 3(a) and 3(b), a die 20 for extruding a moldable ceramic material to form a honeycomb molding is formed from a die-forming work 21 having such a shape that a groove-having surface 31 projects, that moldable-material-supplying apertures 40 are formed in the die-forming work 21 such that they extend from an aperture-having surface 41, and that lattice-patterned grooves 30 are formed on the groove-having surface 31. As shown in FIG. 4, the apertures 40 are overlapping the intersections 33 of the grooves 30 in the molding die 20. A moldable ceramic material introduced into the molding die 20 through the apertures 40 are formed into a honeycomb shape by the grooves 30. The apertures 40 are communicating with the grooves 30 at every intersections 33 of the grooves 30 arranged in a lattice pattern, or at every other intersections 33 (see FIG. 4).

The molding die 10 is produced by forming apertures 40 by drilling, etc. in the die-forming work 21 having a projecting groove-having surface 31 as shown in FIG. 5(a) from its aperture-having surface 41 (on the opposite side of the groove-having surface 31), and then forming the grooves 30 on the groove-having surface 31. The lattice-patterned grooves 30 are produced by forming pluralities of first parallel grooves 30a by grinding or cutting by a rotating tool 50 as shown in FIG. 5(b), rotating the die-forming work 21 by 90°, and then forming pluralities of second parallel grooves 30b crossing the previously formed first grooves 30a as shown in FIG. 5(c).

In a conventional extrusion-molding die, a groove-having surface 31 having an outer periphery 32, which is square as it is formed when viewed from above as shown in FIG. 3(a), or made circular by machining as shown in FIG. 6 as described, for instance, in JP 11-70510 A. In any case, a moldable ceramic material extruded from the die 20 is caused to pass through a guide ring 62 as shown in FIG. 7, to obtain a honeycomb molding 11 having a substantially circular or elliptic cross section perpendicular to the flow paths.

However, when the outer periphery 32 of the groove-having surface 31 has a square shape as shown in FIG. 3(a), some of the grooves 30 which are not used for the extrusion of a honeycomb molding having a substantially circular or elliptic cross section perpendicular to the flow paths are also formed by machining, failing to reduce the number of machining steps. This is true, even when a die having a groove-having surface 31 having a square outer periphery 32 as shown in FIG. 3(a) is formed by machining, and the outer periphery 32 of the groove-having surface 31 is then machined circularly as shown in FIG. 6, as described in JP 11-70510 A.

Using a die-forming work 21 having a groove-having surface 31 having a circularly formed outer periphery 32 to form grooves 30 by machining, the above inefficiency of machining some grooves 30 that are not used for extrusion can be avoided. However, in the machining of the groove-having surface 31 having a circular outer periphery 32 to form grooves 30, some grooves 30 are at extremely small angles 70 to the outer periphery 32 of the groove-having surface 31 as shown in FIG. 8. When machining starts to form a groove 30 as shown by the dotted line in FIG. 8, which has an extremely small angle 70, a cutting edge of a rotating tool 50 is likely to slide along the outer periphery 32 of the groove-having surface 31 as the rotating tool 50 progresses, so that a force P is applied to the tool 50 in its thickness direction (rotation axis direction), deforming or breaking the tool 50.

OBJECT OF THE INVENTION

Accordingly, an object of the present invention is to provide a die for extrusion-molding a honeycomb structure, which has a structure needing the formation of some grooves not used for extrusion molding as little as possible, and less damaging a rotating tool when forming the grooves, and a method for producing a die with reduced number of groove-machining steps.

DISCLOSURE OF THE INVENTION

As a result of intensive research in view of the above object, the inventors have found that with an angle of 30° or more between the outer periphery of the groove-having surface and the progression direction of a rotating tool, breakage, etc. can be effectively avoided in the rotating tool when forming grooves. The present invention has been completed based on such finding.

Thus, the die of the present invention for molding a material to a honeycomb structure has large numbers of grooves, a surface having the grooves having an outer periphery in a polygonal shape having 6 or more corners, and the grooves being crossing the outer periphery at an angle of 30° or more.

The method of the present invention for producing a die having large numbers of grooves for molding a material to a honeycomb structure comprises machining a die-forming work to form a groove-having surface having an outer periphery in a polygonal shape having 6 or more corners, such that the outer periphery crosses the grooves at an angle of 30° or more, and then forming the grooves.

DESCRIPTION OF THE PREFERRED EMBODIMENTS

Figure 9A:
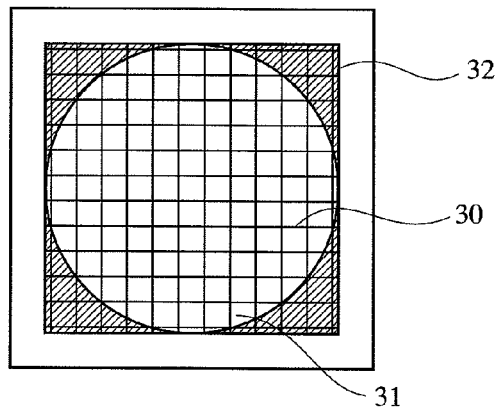
FIG. 9(a) is a schematic view showing a conventional die having molding grooves.
Figure 9B:
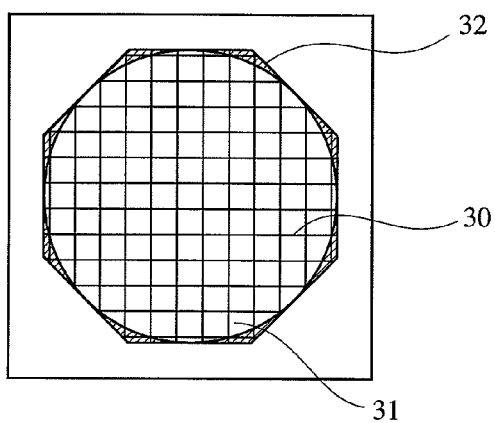
FIG. 9(b) is a schematic view showing the die of the present invention having molding grooves.

With an outer periphery of a groove-having surface in a shape of polygon having 6 or more corners, such as hexagon or octagon (FIG. 1), the machining of some of the grooves that are not used for the extrusion of a honeycomb molding can be reduced, resulting in the reduced number of machining steps. For instance, when the groove-having surface 31 has a square outer periphery 32, some of the grooves 30 that are not used for the extrusion of a honeycomb molding are unnecessarily formed. On the other hand, in the molding die of the present invention with a groove-having surface 31 having an octagonal outer periphery 32 as shown in FIG. 9(b), the ratio of grooves 30 not used for extrusion [in a smaller hatched area in FIG. 9(b) than in FIG. 9(a)] is smaller, resulting in less unnecessary machining.

Figure 10:
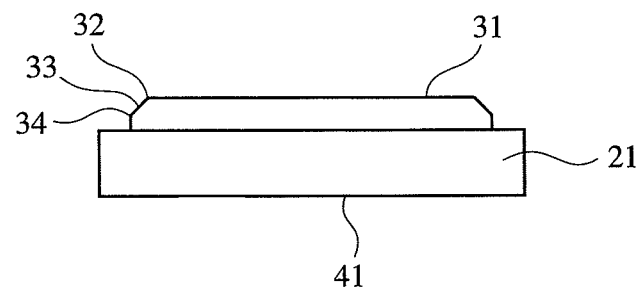
FIG. 10 is a schematic view showing a tapered outer periphery of a groove-having surface of the molding die.

The effect of the present invention is large particularly in the case of a large molding die. The effect of reducing the number of machining steps is remarkable when the maximum length of the grooves 30 in the molding die is 150 mm or more, larger when it is 190 mm or more, and much larger when it is 250 mm or more. When the outer peripheral edge of the groove-having surface 31 has a tapered surface 33 as shown in FIG. 10, the outer periphery 32 of the groove-having surface 31 in the present invention corresponds to a periphery of the groove-having surface 31 in contact with the tapered surface 33. In this case, the tapered surface 33 preferably has an outer periphery 31 substantially in the same shape as that of the outer periphery 32 of the groove-having surface 31.

As the polygonal shape of the outer periphery 32 of the groove-having surface 31 has a larger number of corners like decagon and dodecagon, the percentage of portions of the grooves 30 not used for the extrusion of a honeycomb molding can be reduced. However, this reduces a crossing angle of the outer periphery 32 of the groove-having surface 31 and the grooves 30 in some areas, so that the tool 50 is likely deformed and thus broken. To prevent the tool 50 from being broken, the crossing angle of the outer periphery 32 of the groove-having surface 31 and the grooves 30 should be 30° or more. Because the larger crossing angle of the outer periphery 32 of the groove-having surface 31 and the grooves 30 has a larger effect of preventing the breakage of the tool 50, the crossing angle is preferably 40° or more. Also, the larger crossing angle can reduce the unevenness of a pitch in the grooves 30, which is generated by such small deformation of the tool 50 as not leading to breakage. When each groove 30 in the die has a width of 0.5 mm or less, particularly 0.3 mm or less, the present invention has a large effect. The term "crossing angle" means a smaller angle between two angles at an intersection of the outer periphery 32 of the groove-having surface 31 and a longitudinal centerline of each groove 30.

Figure 11:
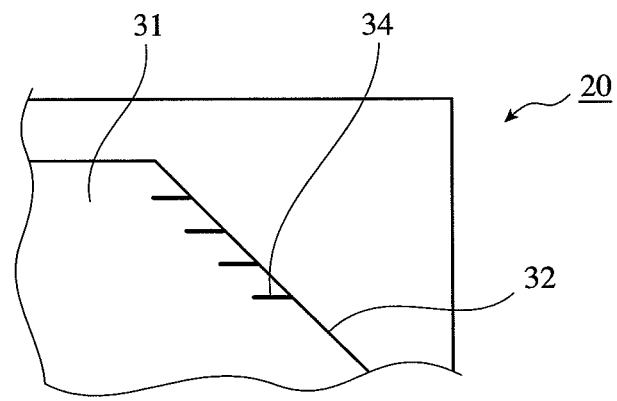
FIG. 11 is a schematic view showing a die provided with guide grooves according to a preferred embodiment of the present invention.

Because a not-so-worn, almost-brand-new tool 50 has good biting to the outer periphery 32 of the groove-having surface 31, it is less likely that the tool 50 is broken, and that the grooves 30 have uneven pitch. Accordingly, the tool 50 is preferably exchanged to new one before it is much worn, but frequent exchange needs large numbers of tools 50, resulting in increased production cost. It is thus preferable to form guide grooves 34 in the number of 10-30, for instance, on the outer periphery 32 of the groove-having surface 31 before the tool 50 is much worn, as shown in FIG. 11. With a tool 50 progressing through the already formed guide groove 34, a groove 30 can be formed even by a much-worn tool 50, without damaging the tool 50 or without providing the resultant grooves 30 with uneven pitch. The guide grooves 34 are preferably as long as 5-30 mm, and the number of guide grooves formed by each tool 50 is preferably 30 or less to prevent the breakage of the tool 50 due to its wear, and the pitch unevenness of the grooves 30.

In order that the crossing angle of the outer periphery 32 of the groove-having surface 31 and the grooves 30 is 30° or more, the groove-having surface 31 of the molding die 20 preferably has an outer periphery 32 in a shape of hexagon, octagon or dodecagon. The outer periphery 32 of the groove-having surface 31 is preferably regular octagon or dodecagon, because a first machining step for forming pluralities of first parallel grooves 30a, and a second machining step for forming pluralities of second parallel grooves 30b crossing the first grooves 30a with the die-forming work 21 rotated by 90° can be conducted under the same conditions. For instance, in the case of the molding die shown in FIG. 9(b), which has a regular-octagonal outer periphery 32, the 90°-rotated, groove-having surface completely overlaps the original one, making it possible to conduct the first and second machining by the same program.

The polygonal outer periphery 32 of the groove-having surface 31 may have not only sharp corners but also round or chamfered corners. When the round or chamfered corners are machined to form grooves 30, their crossing angle should be 30° or more. Although each side of the polygon may be not only straight but also rounded or waved, the crossing angle of each side and the grooves 30 should be 30° or more.

Figure 1:
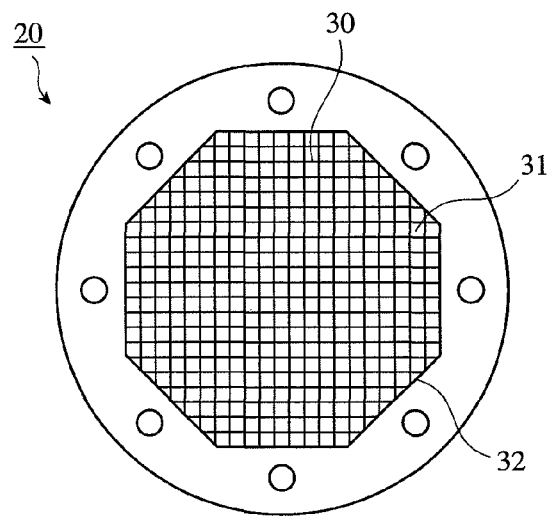
FIG. 1 is a schematic front view showing one example of the molding dies of the present invention.
Figure 2A:
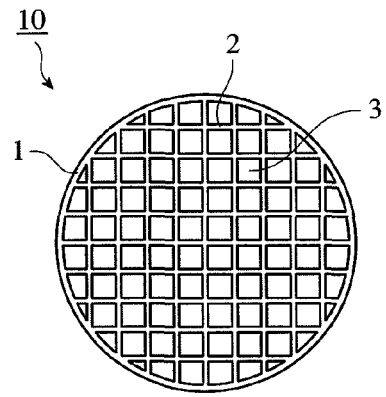
FIG. 2(a) is a schematic cross-sectional view showing one example of the honeycomb structures perpendicularly to flow paths.
Figure 2B:
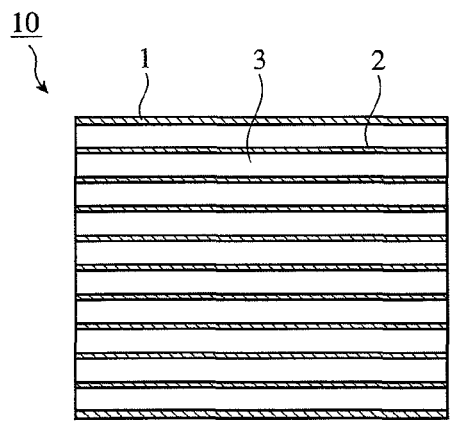
FIG. 2(b) is a schematic cross-sectional view showing one example of the honeycomb structures in parallel to flow paths.

Although the molding die 20, namely the aperture-having surface 41, has a circular shape in FIG. 1, this shape is not restricted to circle but may be any shape. For instance, it may be square as shown in FIG. 9(b), and when the groove-having surface 31 has an octagonal outer periphery 32, the aperture-having surface 41 may have an octagonal shape. Though not particularly restricted, materials for the die-forming work 21 are preferably alloy tool steel, stainless steel, high-speed tool steel, etc. usually used for molding dies, from the aspect of machinability and wear resistance. Because of difficulty to machine, stainless steel tends to generate deformation in the tool 50 at the start of machining the grooves 30, when the outer periphery 32 of the groove-having surface 31 and the grooves 30 have a small crossing angle. Accordingly, the present invention is effective, when the die 20 is formed from a stainless steel work. The present invention is more effective when the tool 50 for machining grooves 30 is a disc grinder having a thickness of 0.5 mm or less, and further effective when the thickness is 0.3 mm or less. When machining the grooves 30, the tool 50 preferably has a cutting depth of 1 mm or more and a feed speed of 5 mm/min or more.

The present invention will be explained in further detail by Examples below without intention of restricting the present invention thereto.

Example 1

(1) Formation of Moldable-Material-Supplying Apertures

Figure 4:
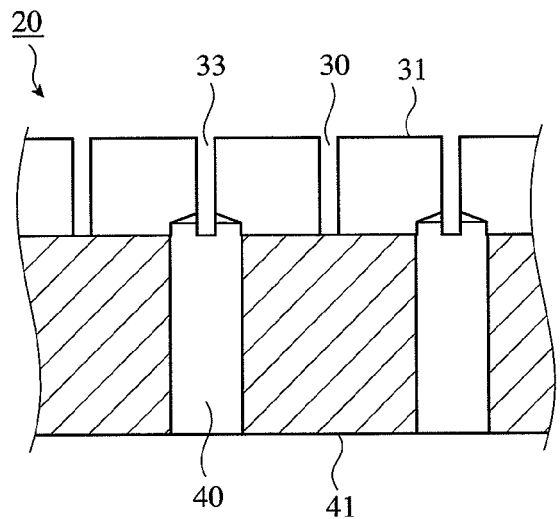
FIG. 4 is a cross-sectional view showing one example of the molding dies.
Figure 5A:
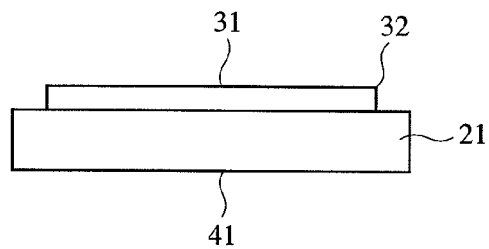
FIG. 5(a) is a schematic view showing a work for the conventional molding die.
Figure 5B:
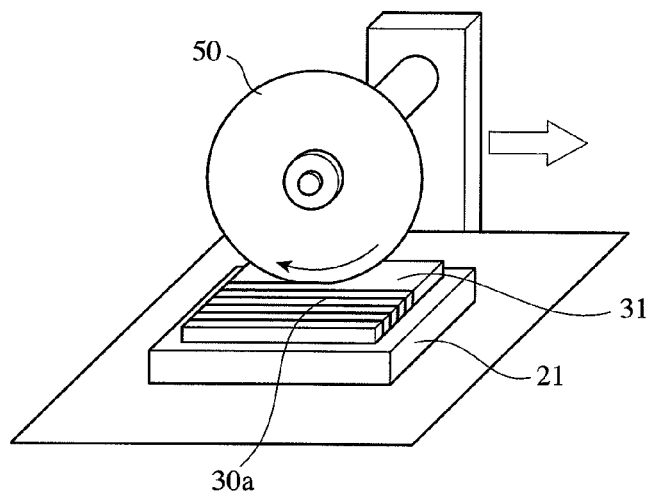
FIG. 5(b) is a schematic view showing the formation of first grooves in the conventional molding die.
Figure 5C:
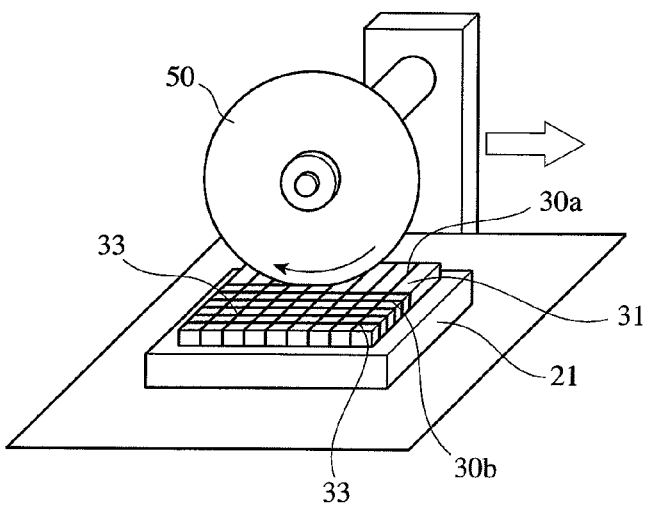
FIG. 5(c) is a schematic view showing the formation of second grooves in the conventional molding die.

Prepared was a die-forming work 21 made of alloy tool steel (JIS G4404), which had a groove-having surface 31 having a regular-octagonal outer periphery 32 circumscribed by a circle having a diameter of 240 mm, and an aperture-having surface 41 of 260 mm×260 mm. The die-forming work 21 was drilled by a cemented carbide drill having a diameter of 1.1 mm and a tip angle of 140° from an aperture-having surface 41 to form moldable-material-supplying apertures 40 as shown in FIG. 4.

Grooves 30 were formed on the groove-having surface 31 by machining by a rotating tool 50, which was a thin disc grinder having a thickness of 0.25 mm and a diameter of 100 mm. Pluralities of first grooves 30a in parallel with one outer periphery 32 of the groove-having surface 31 were first formed in the die-forming work 21, which was then turned by 90° to form pluralities of second parallel grooves 30b perpendicular to the first grooves 30a. Perpendicular grooves 30a, 30b were 0.26 mm in width and 6.5 mm in depth with a pitch of 1.5 mm. Thus obtained was a molding die 20 having grooves 30 formed in a lattice pattern in the groove-having surface 31 having a regular-octagonal outer periphery 32 as shown in FIG. 1. In the process of machining the grooves 30, the tool 50 was not broken. There was no unevenness in the pitch of the molding grooves 30.

Example 2

A molding die 20 was produced in the same manner as in Example 1, except that the shape of the outer periphery 32 of the groove-having surface 31 was changed to regular dodecagon, and that guide grooves 34 were formed before forming the grooves 30 as shown in FIG. 11. In Example 2, the minimum crossing angle 70 was 30°. In the process of machining the grooves 30, the tool 50 was not broken. There was no unevenness in the pitch of the molding grooves 30.

Comparative Example 1

Figure 3A:
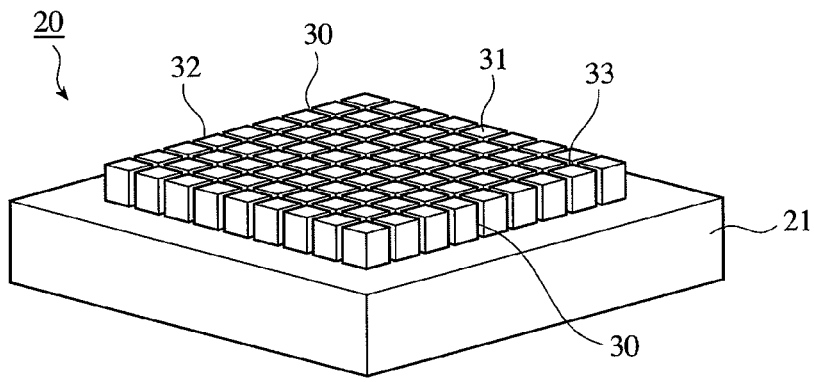
FIG. 3(a) is a perspective view showing a conventional molding die on the groove-having surface side.
Figure 3B:
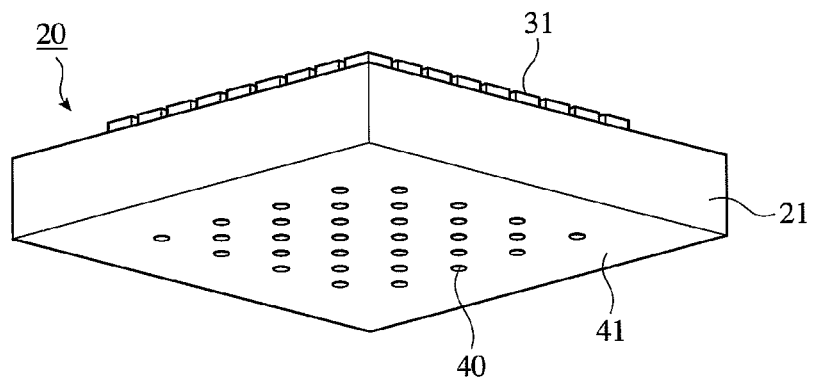
FIG. 3(b) is a perspective view showing a conventional molding die on the side of a surface having moldable-material-supplying apertures.

A molding die 20 was produced in the same manner as in Example 1, except for changing the shape of the outer periphery 32 of the groove-having surface 31 to a square of 240 mm×240 mm as shown in FIG. 3(a). In Comparative Example 1, the tool 50 was not broken in the process of machining the grooves 30, but the machining time of the grooves 30 was as long as 1.14 times that of Example 1.

Comparative Example 2

Figure 6:
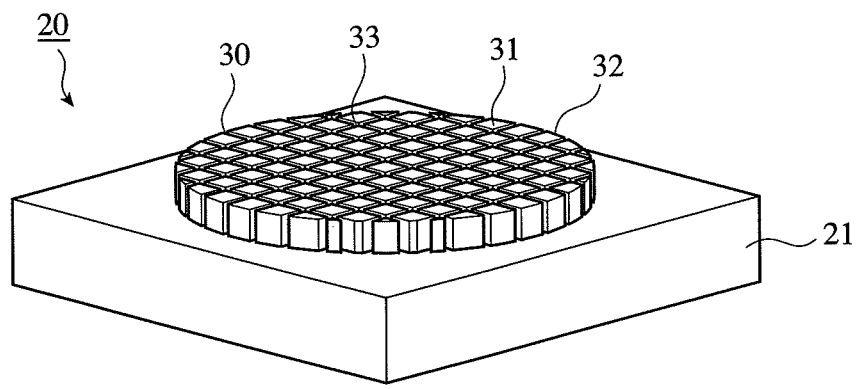
FIG. 6 is a perspective view showing another example of the conventional molding dies.
Figure 7:
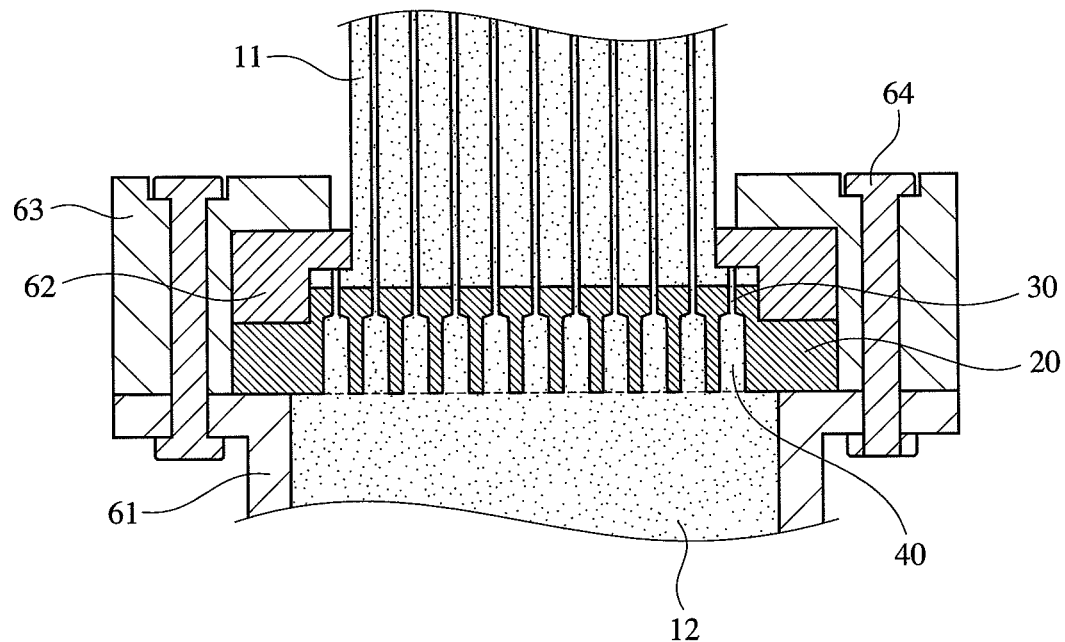
FIG. 7 is a schematic cross-sectional view showing the structure of a honeycomb-structure-extruding apparatus near the molding die.
Figure 8:
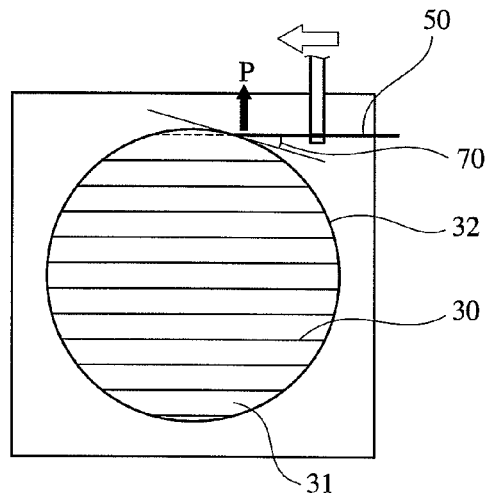
FIG. 8 is a schematic view showing a force applied to a rotating tool, which is machining a groove at an extremely small crossing angle.

A molding die 20 was produced in the same manner as in Example 2, except for changing the shape of the outer periphery 32 of the groove-having surface 31 to a circle having a diameter of 240 mm as shown in FIG. 6. In Comparative Example 2, a groove 30 passing a center of the circular groove-having surface 31 was first formed, and a groove 30 adjacent to the previously formed groove 30 was then repeatedly formed, such that a crossing angle 70 between the groove 30 and the outer periphery 32 of the groove-having surface 31 became gradually smaller. Such machining revealed that when the crossing angle 70 was smaller than 30°, the molding grooves 30 had small pitch unevenness, which did not cause any trouble in the extrusion of a honeycomb molding. However, when the crossing angle 70 was 23° or less, the tool 50 was broken during forming guide grooves 34 for the grooves 30.

EFFECT OF THE INVENTION

According to the present invention, less grooves not used for extrusion molding are machined, resulting in reduced number of machining steps, and a rotating tool is less likely broken during forming the grooves. Therefore, the time and cost of machining a die for molding a honeycomb structure can be drastically reduced.

What is claimed is:

1. A method for producing a die having large numbers of grooves for molding a material to a honeycomb structure, comprising machining a die-forming work to form a groove-having surface having an outer periphery in a regular octagonal or dodecagonal shape, such that said outer periphery crosses said grooves at an angle of 30° or more, and then forming said grooves using a rotating tool, wherein guide grooves having a length of 5 to 30 mm are formed only on the outer periphery of the groove-having surface before forming said grooves.

2. A method for producing honeycomb-structure-extruding apparatus comprising a die having large numbers of grooves for molding a material to a honeycomb structure and a guide ring for forming a honeycomb structure having a substantially circular cross section, comprising machining a die-forming work to form a groove-having surface having an outer periphery in a regular octagonal or dodecagonal shape, such that said outer periphery crosses said grooves at an angle of 30° or more, and then forming said grooves using a rotating tool, wherein guide grooves having a length of 5 to 30 mm are formed only on the outer periphery of the groove-having surface before forming said grooves.

* * * * *